Sept. 18, 1945.  B. A. DIESEL  2,385,196
PICK-UP TRUCK
Filed March 2, 1944  3 Sheets-Sheet 1
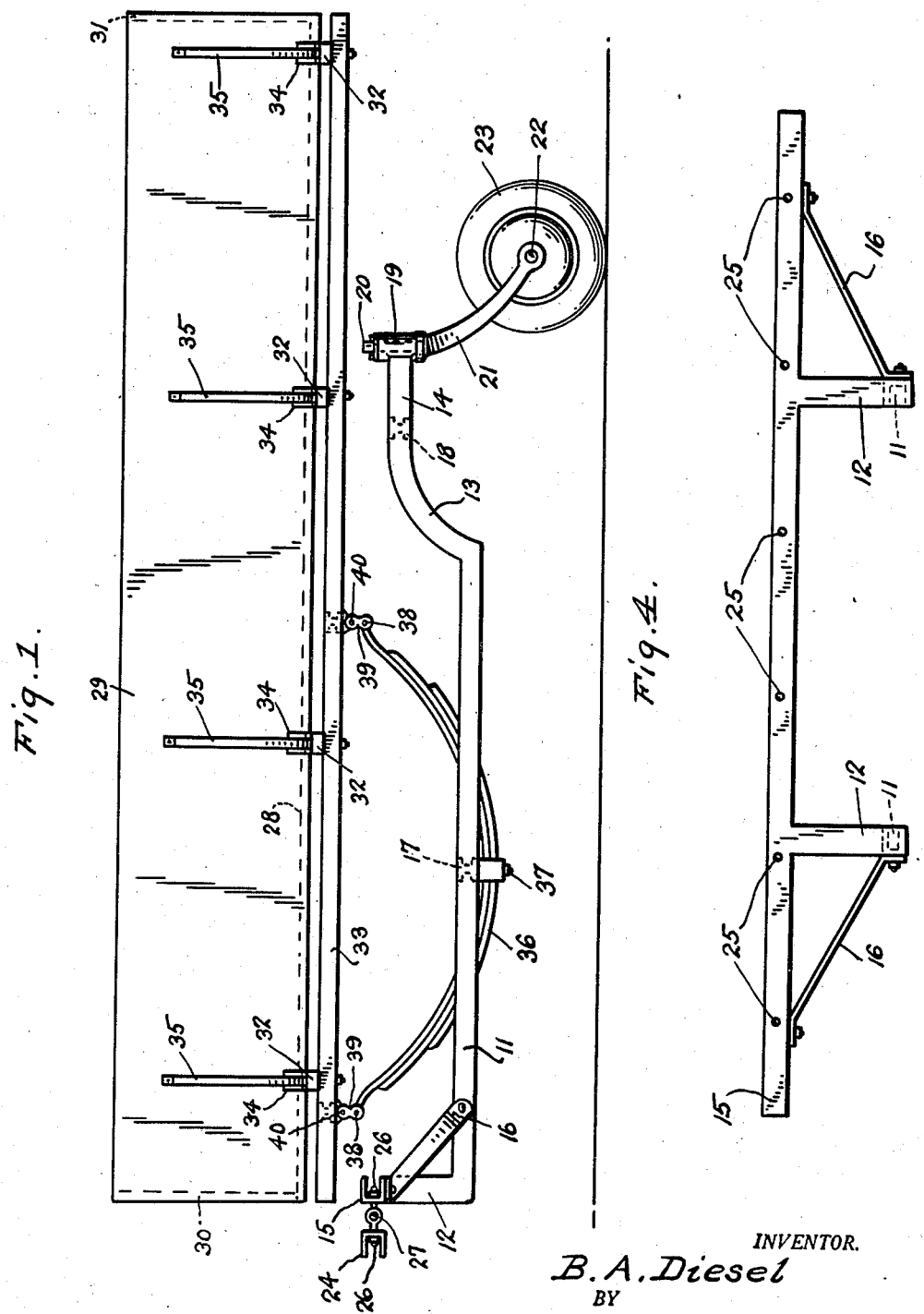
INVENTOR.
B. A. Diesel
BY
Victor J. Evans & Co.
ATTORNEYS Sept. 18, 1945.  B. A. DIESEL  2,385,196
PICK-UP TRUCK
Filed March 2, 1944  3 Sheets-Sheet 3
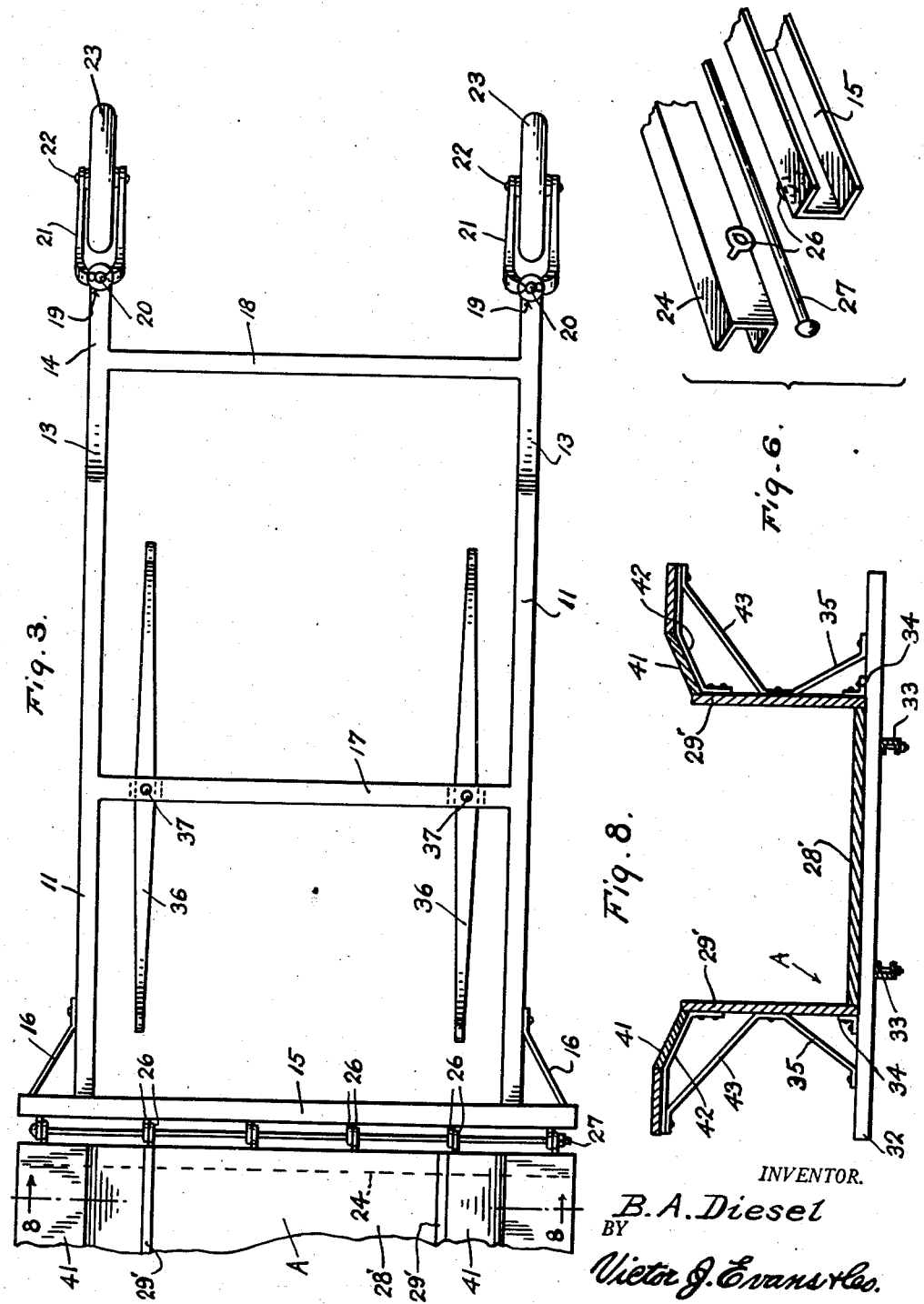
INVENTOR.
B. A. Diesel
BY
Victor J. Evans & Co.
ATTORNEYS Sept. 18, 1945.　　　　B. A. DIESEL　　　　2,385,196
PICK-UP TRUCK
Filed March 2, 1944　　　　3 Sheets-Sheet 2
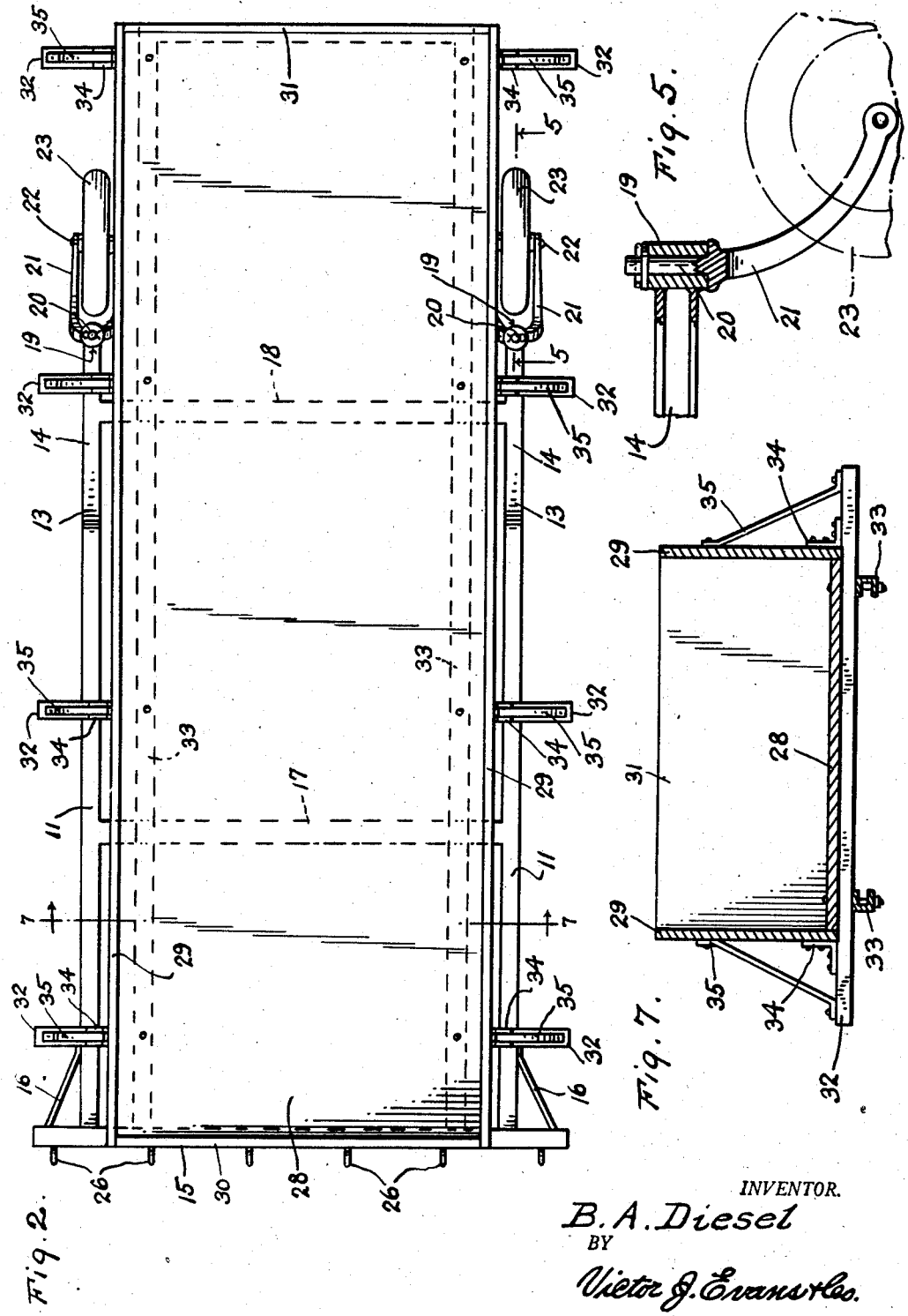

Patented Sept. 18, 1945

2,385,196

UNITED STATES PATENT OFFICE 2,385,196

PICKUP TRUCK

Benjamin A. Diesel, Los Angeles, Calif.

Application March 2, 1944, Serial No. 524,749

5 Claims. (Cl. 280—33.4)

This invention appertains to trucks generally, and more particularly to a semi-trailer pickup type thereof.

An object of the invention is to provide a light-weight trailer truck that is adapted to be coupled to the so-called "pickup" type of automotive vehicle, in order to permit of the hauling of loads in greatly increased volume, particularly on farms where loads are, more often than not, of great bulk but light in weight.

A further object of the invention lies in the provision of a novel and simple hitch for coupling the trailer to a pickup truck, the hitch being adapted to couple the trailer to the frame of the truck, being adapted to permit the free movement of the trailer with relation to the truck about a horizontal axis extending transversely of the truck and trailer, being adapted to hold the trailer against movement in any other direction with relation to the truck, and being adapted to provide for the full control of the trailer from the pickup truck while moving forwardly or backing.

Another object of the invention has to do with the provision of a trailer truck of the kind specified, which involves certain refinements in construction that make for inexpensive manufacture, without sacrifice in durability and strength, by reason of the desired reduction in weight of the materials employed in its make-up.

A further objection of the invention lies in the provision of a novel form of chassis and an equally novel spring mounting of a large capacity body thereon, whereby the pulling strain through the coupling from the automotive vehicle is taken wholly by the chassis, such as would otherwise subject the body to destructive stresses, causing a shortening of its life of usefulness.

With these and other objects and advantages in view, the invention resides in the certain new and useful combination, construction and arrangement of parts, as will be hereinafter more fully described, set forth in the appended claims, and illustrated in the accompanying drawings, in which:

Figure 1 is a side elevation of the trailer pickup truck, in accordance with the invention.

Figure 2 is a top plan view.

Figure 3 is a top plan view of the chassis, with the body removed therefrom, and showing the coupling between the opposed ends of the chassis and the automotive vehicle.

Figure 4 is a front end elevation of the chassis per se.

Figure 5 is a vertical longitudinal section, taken through the line 5—5 of Figure 2.

Figure 6 is a fragmentary view of opposed end portions of the transverse coupling bars of the automotive vehicle and the chassis of the trailer pick up truck, and showing the coupling means therefor.

Figure 7 is a vertical transverse section of the body and body frame only, the same being taken through the line 7—7 of Figure 2.

Figure 8 is a view similar to that of Figure 7, but showing a modified body construction.

Referring to the drawings, wherein like characters of reference denote corresponding parts throughout the several views, the invention, as it is exemplified therein, is generally comprised in a chassis; means for detachably coupling the chassis to the rear of an automotive vehicle, such as a "pickup" truck; and a body on the chassis, with a loading capacity considerably greater than that of the loading compartment of the pickup truck.

The chassis is comprised in a frame, made up of longitudinal side bars 11, preferably in the form of lengths of light-weight, steel, U-channel beams, which have their front ends angularly bent to provide upstanding portions 12 and their rear ends upwardly and rearwardly curved, as at 13, to provide horizontally disposed extremities 14, that lie in a common plane with a transverse, draft, coupling bar 15, connected to the upper ends of the vertical portions 12. The ends of the coupling bar 15 project beyond their points of connection with the vertical portions 12 and these ends are braced, as at 16, to the side bars 11. A transverse bar 17 connects the side bars 11, at points centrally between the vertical portions 12 and the upwardly curved portions 13, and another transverse bar 18 connects the side bars 11, inwardly of the free ends of the horizontal portions 14. The free ends of the portions 14 carry vertically disposed bearing sleeves 19, in each of which is journalled the spindle 20 of a "crazy" ground wheel or caster 23, the spindle 20 projecting upwardly from the connected end of a fork or yoke 21 which, preferably, curves downwardly and rearwardly for the journalling of the axle 22 in its leg extremities.

The coupling means, as before stated, includes the front transverse bar 15, of the chassis, and a like bar 24 is to be secured to the frame beneath the rear end of the loading compartment A (Figure 3), of the automotive pickup truck, both of which bars have their opposed vertical sides provided with a series of equidistantly spaced apertures 25 (Figure 4) for the securement therein of coupling elements, such as the eye bolts 26. The coupling is effected by lining the trailer pickup truck up with and at the rear of the automotive pickup truck, so that the eyes of the bolts 26 overlap in a manner to dispose the apertures thereof in horizontal alignment to receive suitable fastenings, such as a rod 27, through the same, by which arrangement, the two vehicles can have substantially free relative vertical movements, incident to travel.

The trailer pickup body is comprised in a bottom or bed 28 opposite side walls 29, and front and rear end walls 30 and 31, respectively, one or the other, or both, of the latter walls made removable, if desired, and the body is supported on a frame comprising spaced bars 32 secured crosswise of a pair of longitudinally extending bars or beams 33; the bed 28 being laid upon the cross bars 32, with the side walls 29 bracketed, as at 34, to the cross bars and in abutted relation to the opposed side edges of the bed, substantially as shown in Figures 7 and 8. The ends of the cross bars 32 are, preferably, projected beyond the side walls 29 for the securement to the same of angled brace members 35 sloping downwardly from points of securement to the side walls.

The body or bed frame is supported above the chassis by a pair of springs 36, preferably of the half-elliptic leaf type, which are secured at their centers, as at 37, to the under sides of the cross bar 17, of the chassis, and have their ends pivoted, as at 38, to shackles 39, that are, in turn, pivoted, as at 40, to the longitudinal bars or beams 33; the shackle connections permitting endwise movements of the springs as they flatten under load.

As shown in Figure 8, the body may be modified by having its side walls 29 provided with angled wings 41, which are co-extensive with the top edges thereof, and extend outwardly of the same on supporting brackets 42 that are secured to the side walls and braced, as at 43, therefrom.

With this understanding of the invention, it is believed that advantages to be derived from its simplified and light-weight construction, and the ease by which it may be quickly coupled and uncoupled to and from, for instance, a Ford pickup truck, will have the appreciation of both the user and the manufacturer, it having been found to be of great utility about the farm for crop, as well as general, hauling purposes, making for cheap transportation of various commodities and materials, particularly in view of the shortage of labor and the higher cost of larger and heavier truck equipment.

The manner in which the trailer is connected to the pickup truck, and the use of caster wheels at the rear end of the trailer, simplifies the operation of the pickup truck and makes it easy for the driver of the pickup truck to reverse the truck with the trailer under complete control.

The eyes 26 may be welded to the facing sides of the bars 15 and 20, and the bars may be arranged with their open sides facing forwardly and rearwardly respectively, or facing downwardly. The bar 24 may be welded, bolted or secured to the frame of the pickup truck in any other suitable manner. These parts and the rods 27 provide a hitch which connects the trailer to the truck in such manner as to prevent any movement of the trailer with relation to the truck except about a horizontal axis extending transversely of the truck and trailer and which also provides for the full control of the trailer from the truck while moving forwardly or backing. The hitch also permits the trailer to be readily and quickly coupled to or uncoupled from the truck.

Having thus fully described my invention, it is to be understood that various changes in structural details and the substitution of wooden frame elements for those of steel or iron, may be resorted to, without departing from the spirit of the invention, or its scope as claimed.

What I claim is:

1. A trailer truck comprising a chassis made up of parallel side bars, cross bars connecting the side bars at points to either side of the transverse centers thereof, ground wheels journalled in the rear ends of the side bars, a draft coupling bar connecting the front ends of the side bars, semi-elliptic leaf springs secured at their centers to the cross bar located forwardly of the transverse centers of the side bars, and a body supported on the springs with its front end disposed in the plane of the front end of the chassis and its rear end extending beyond the ground wheels, with the side bars having elevated end portions disposed in a common plane for the support of the body from the central portions intermediate the elevated end portions, so that the body is disposed substantially in the plane of a loading compartment of an automative pickup truck to which the trailer truck is adapted to be coupled.

2. A semi-trailer truck comprising a chassis made up of parallel side bars having upwardly extending end portions terminating in a common plane, cross bars connecting the side bars at points inwardly from their ends, ground wheels journalled in the rear elevated ends of the side bars, a body, springs mounted on the chassis forwardly of its transverse center and supporting the body above the chassis, and a draft coupling bar extending transversely of the chassis and connecting the ends of the upstanding portions at the front end of the chassis.

3. A semi-trailer truck comprising a chassis made up of parallel side bars having upwardly extending end portions terminating in a common plane, cross bars connecting the side bars at points inwardly from their ends, ground wheels journalled in the rear elevated ends of the side bars, a body, springs mounted on the chassis forwardly of its transverse center and supporting the body above the chassis, and a draft coupling bar extending transversely of the chassis and connecting the ends of the upstanding portions at the front end of the chassis, with upwardly extending portions at the rear ends of the side bars having rearwardly directed horizontal extensions and the ground wheels in the form of casters having the spindles at the connected ends of their forks journalled in the free ends of the horizontal extension.

4. A semi-trailer truck comprising a chassis having elevated end portions lying in a common plane to provide a low-slung intermediate portion, a coupling bar secured transversely of the forward end of the chassis, crazy wheels having their forks pivoted to the rear end of the chassis, semi-elliptic springs mounted longitudinally of the chassis forwardly of the transverse center of the low-slung portion thereof, a body supported on the springs and overlying the elevated end portions of the chassis, the rear end of the body projecting beyond the rear end of the chassis and the crazy wheels.

5. A trailer truck comprising a chassis, made up of parallel side bars having their forward ends turned upwardly at right angles and connected by a draft bar, the rear ends of the side bars curved upwardly and terminating in a horizontal plane with the upwardly turned forward ends, ground wheels vertically journaled in the upper ends of the upwardly curved rear ends of the side bars, semi-elliptical leaf springs secured to the central lower portion of the side bars by a transverse bar, and a body mounted on the upper ends of said springs in a plane above the upwardly turned ends of the side bars.

BENJAMIN A. DIESEL.